US007038183B2

(12) United States Patent
Benthien

(10) Patent No.: US 7,038,183 B2
(45) Date of Patent: May 2, 2006

(54) IMAGE SENSOR DEVICE COMPRISING CENTRAL LOCKING

(75) Inventor: Stephan Benthien, Domene (FR)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 10/451,461

(22) PCT Filed: Dec. 18, 2001

(86) PCT No.: PCT/EP01/15000

§ 371 (c)(1),
(2), (4) Date: Apr. 12, 2004

(87) PCT Pub. No.: WO02/51130

PCT Pub. Date: Jun. 27, 2002

(65) Prior Publication Data

US 2004/0155247 A1    Aug. 12, 2004

(30) Foreign Application Priority Data

Dec. 21, 2000  (DE) ................................. 100 63 838

(51) Int. Cl.
*H01L 27/00* (2006.01)
*H04N 5/335* (2006.01)
(52) U.S. Cl. .................... 250/208.1; 348/294; 348/308
(58) Field of Classification Search ............ 250/208.1, 250/214 R, 214.1; 348/294, 296, 297, 301, 348/302, 304, 308, 299; 257/290–292, 443, 257/445
See application file for complete search history.

(56) References Cited

U.S. PATENT DOCUMENTS 5,471,515 A * 11/1995 Fossum et al. ............... 377/60
6,882,367 B1 * 4/2005 Merrill et al. .............. 348/308

* cited by examiner

*Primary Examiner*—Kevin Pyo
(74) *Attorney, Agent, or Firm*—Lisa K. Jorgenson; James H. Morris; Wolf, Greenfield & Sacks, P.C.

(57) ABSTRACT

The invention relates to an image sensor device comprising a substrate, formed in CMOS technology, in particular, with an integrated semiconductor structure (ASIC) and, arranged above that, an optically active thin-film structure comprising in each case at least one layer made of doped and undoped amorphous silicon, spatially adjacent pixels in each case being formed in the horizontal plane, which pixels each have an optoelectronic transducer for converting incident light into an electric current proportional to the incident quantity of light, and also a charge store assigned to the optoelectronic transducer, the charge state of which charge store can be varied in a manner dependent on the light incident on the assigned optoelectronic transducer. Taking this as a departure point, the invention is based on the object of further developing an image sensor device of the stated type to the effect of avoiding image distortions in the case of moving objects, which is achieved according to the invention by virtue of the fact that the charge store is a capacitor ($C_{int}$), in which the photocurrent output by the optoelectronic transducer can be integrated during a predetermined measurement duration, and that a switching means ($T_{stop}$) that can be driven by a common control device is provided in each pixel, which switching means can be driven jointly for all the pixels of the image sensor device.

10 Claims, 1 Drawing Sheet

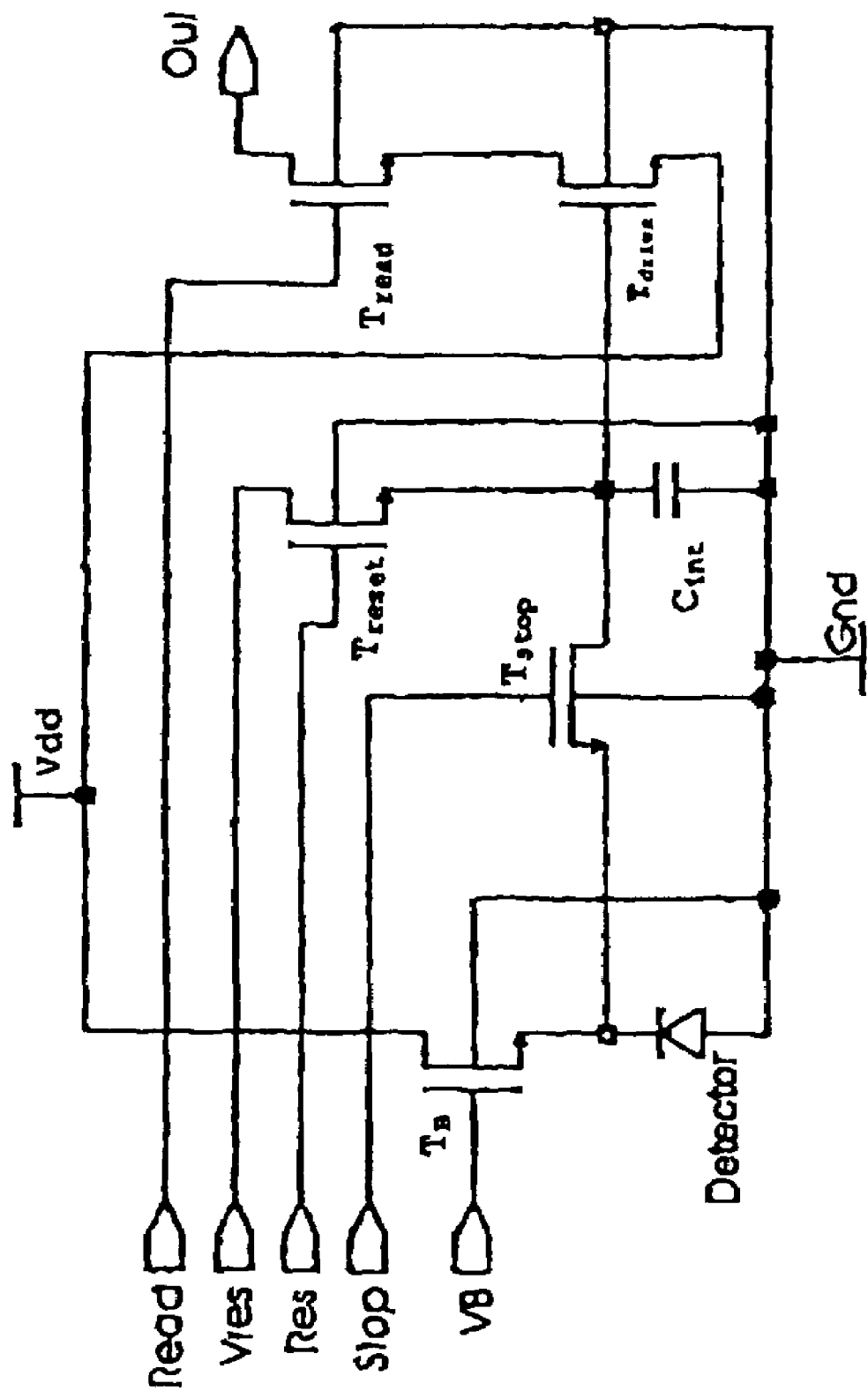

IMAGE SENSOR DEVICE COMPRISING CENTRAL LOCKING

The invention relates to an image sensor device comprising a substrate, formed in CMOS technology, in particular, with an integrated semiconductor structure (ASIC) and, arranged above that, an optically active thin-film structure comprising in each case at least one layer made of doped and at least one made of undoped amorphous silicon, spatially adjacent pixels in each case being formed in the horizontal plane of the image sensor device, which pixels each have an optoelectronic transducer for converting incident light into an electrical signal proportional to the incident quantity of light, in particular an electric current, and also a charge store assigned to the optoelectronic transducer, the charge state of which charge store can be varied in a manner dependent on the light incident on the assigned optoelectronic transducer.

An image sensor device of the type mentioned is known from the art. Such an image sensor comprises a substrate, usually fabricated in CMOS technology, with semiconducting properties and a thin-film structure of optically active layers deposited thereon. This technology is also referred to as thin film on ASIC (TFA technology). In image sensors of this type, the optically active layers are situated on the top side of the ASIC substrate structure, and individual pixels are in each case formed there in a horizontally adjacent manner. Each individual pixel has an optoelectronic transducer in the form of a photodiode in which the incident light is converted into an electrical signal proportional to the incident quantity of light, in particular an electric current. In order to detect the measurement signal, the optoelectrical transducer is assigned a charge store, in particular a capacitor, into which the photocurrent flows during the predetermined measurement duration, i.e. during the so-called integration phase, so that the charge state of the capacitor is a measure of the quantity of light that has been incident within the integration duration.

After the measurement time has elapsed, in each pixel the measured value stored in its associated capacitor is read out and processed further under the control of peripheral electronics.

Hitherto, such image sensors known from the art have not been afforded the possibility of carrying out the exposure process by jointly driving all the individual pixels. Rather, in the art, the procedure has been such that, in the case of a matrix-organized areal sensor, all the pixels within an individual row have been driven, the associated measured values have been read out and then the next row of the image sensor has been processed correspondingly. This results in a so-called "rolling shutter". One disadvantage of such a technique is that the temporal offset in the course of the row-by-row driving gives rise to a distortion during the recording of a moving object.

Taking this as a departure point, the invention is based on the object of further developing an image sensor of the type mentioned in the introduction to the effect of avoiding image distortions in the case of moving objects.

This object is achieved according to the invention by virtue of the fact that the charge store is a capacitor ($C_{int}$), in which the photocurrent output by the optoelectronic transducer can be integrated during a predetermined measurement duration, and in that a switching means ($T_{stop}$) that can be driven by a common control device is provided in each pixel, which switching means can be driven jointly for all the pixels of the image sensor device.

The invention is distinguished by the fact that, on account of the contemporaneous driving of all the switching means of the individual pixels, on account of the structure of the image sensor according to the invention, with regard to the optical functionality, too, an image sensor is equipped with a central shutter. In conventional image sensors embodied in CMOS technology, photogenerated charge carriers diffuse into that region of the sensor in which the integrated semiconductor circuit is arranged. On account of the influence of adjacent pixels, in the case of the known technology, charge carrier diffusion processes take place not only within an individual pixel but also between adjacent pixels, that is to say that photogenerated charge carriers diffuse in undesirable directions and lead to image corruptions. On account of these undesirable diffusion currents from the substrate, the pixel is subjected to further exposure even though the electronic driving had modulated the exposure. Such an effect is avoided in the case of an image sensor having the construction mentioned in the introduction since the individual optoelectronic transducers of the pixels are not situated in the substrate itself—as in the prior art—but rather in the additional layer above the substrate. This results in a spatially functional separation of the optically active layers from the electronically active layers, so that the above-described disadvantageous diffusion currents into adjacent pixels are avoided, so that functionally it is possible to realize a genuine central shutter.

Preferred embodiments of the invention emerge from the subclaims.

The invention is explained in more detail below with reference to a drawing showing an exemplary embodiment. The electronic circuit illustrated in the figure relates to an individual pixel and has an optoelectronic transducer which is embodied as a detector and with which a charge store in the form of a capacitor $C_{int}$ is connected in parallel. One of the common terminals is connected to the ground potential $G_{nd}$, while the other terminals of detector and capacitor $C_{int}$ are connected to one another by a semiconductor switch $T_{stop}$. The gate terminal of the semiconductor switch $T_{stop}$ is connected to a potential designated by "stop". The source of a further semiconductor switch $T_B$ is provided at the junction point between semiconductor switch and detector, the drain of said switch being connected to a fixed potential Vdd and the base of said switch being connected to a bias voltage VB.

The remaining elements illustrated in the drawing relate to the operation of reading out the measured value stored in the charge store and are not of importance for understanding the present invention.

At the beginning of the measurement operation, the semiconductor switch $T_{stop}$ is driven at its gate such that it is in the on state. As a result of this, a photocurrent detected by the optoelectronic transducer flows into the charge store $C_{int}$. In this case, the detector current generated by the detector is proportional to the illumination incident on the pixel. If the integration of the photocurrent is to be ended, the semiconductor switch $T_{stop}$ is driven in all the pixels of the image sensor to the effect that it is switched into the off state, so that the detector current is conducted via the open transistor $T_B$ instead. Since the driving is effected uniformly and simultaneously for all the semiconductor switches, a central shutter of the image sensor is realized in this way without needing additional technical measures.

The invention claimed is:

1. An image sensor device, comprising: a substrate, formed in CMOS technology with an integrated semiconductor structure (ASIC) and spatially adjacent pixels in each case being formed in the horizontal plane of the image sensor device, which pixels each have an optoelectronic transducer for converting incident light into an electrical current proportional to the incident quantity of light and also a charge store assigned to the optoelectronic transducer, the charge state of which charge store can be varied in a manner dependent on the light incident on the assigned optoelectronic transducer, wherein the charge store is a capacitor in which photocurrent output by the optoelectronic transducer is integrated during a predetermined measurement duration, and in that a first switching means is provided in each pixel that can be driven by a common control device, which said first switching means is coupled to the transducer and can be driven jointly for a plurality of pixels of the image sensor device; and a second switching means coupled to the transducer having a control input coupled to a bias voltage such that the second switching means switches from an off state to an on state in response to the first switching means switching from an on state to an off state, wherein the second switching means provides a current path through which photocurrent generated by the transducer is diverted while the first switching means is in the off state.

2. The image sensor device as claimed in claim 1, wherein the first switching means is a transistor.

3. The image sensor device as claimed in claim 1, wherein the image sensor device has a row of individual pixels.

4. The image sensor device as claimed in claim 1, wherein the image sensor device has an area arrangement of pixels.

5. An image sensor device having a plurality of pixels, comprising:

a transducer for converting light into an electrical current;

a capacitor;

a first switch coupled to the transducer; and a second switch coupled to the transducer and the first switch, the second switch comprising a control terminal coupled to a bias voltage such that the second switch switches from an off state to an on state in response to the first switch switching from an on state to an off state, wherein the second switch provides a current path through which photocurrent generated by the transducer flows while the first switch is in the off state.

6. The image sensor of claim 5, wherein the first switch is coupled to the capacitor.

7. The image sensor of claim 5, wherein the transducer is provided with a supply voltage when the second switch is in an on state.

8. The image sensor of claim 5, wherein the bias voltage is at a voltage such that the second switch automatically switches to an on state when the first switch switches to an off state.

9. The image sensor of claim 5, wherein the capacitor is coupled to the transducer when the first switch is in the on state.

10. The image sensor of claim 5, wherein the first switch acts as a shutter for the image sensor.

* * * * *